(12) United States Patent
Hall (10) Patent No.: US 10,839,537 B2
(45) Date of Patent: Nov. 17, 2020

(54) DEPTH MAPS GENERATED FROM A SINGLE SENSOR

(71) Applicant: STMicroelectronics (Research & Development) Ltd., Marlow (GB)

(72) Inventor: Duncan Hall, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 146 days.

(21) Appl. No.: 15/150,494

(22) Filed: May 10, 2016

(65) Prior Publication Data

US 2017/0188017 A1  Jun. 29, 2017

(30) Foreign Application Priority Data

Dec. 23, 2015 (EP) .................................. 15202560

(51) Int. Cl.
| | |
|---|---|
| G06T 7/571 | (2017.01) |
| H04N 13/218 | (2018.01) |
| H04N 13/271 | (2018.01) |
| G06T 7/529 | (2017.01) |
| G06K 9/00 | (2006.01) |
| H04N 13/00 | (2018.01) |

(52) U.S. Cl.
CPC .......... G06T 7/571 (2017.01); G06K 9/00335 (2013.01); G06T 7/529 (2017.01); H04N 13/218 (2018.05); H04N 13/271 (2018.05); G06T 2207/10016 (2013.01); G06T 2207/20021 (2013.01); G06T 2207/30196 (2013.01); G06T 2207/30268 (2013.01); H04N 2013/0085 (2013.01); H04N 2013/0092 (2013.01)

(58) Field of Classification Search
CPC .................................. G06T 7/571; G06T 7/50
See application file for complete search history.

(56) References Cited

U.S. PATENT DOCUMENTS

| | | | | |
|---|---|---|---|---|
| 5,592,562 | A * | 1/1997 | Rooks .................. | G01N 23/046 29/830 |
| 9,456,141 | B2 * | 9/2016 | Fishman ............ | H04N 5/23293 |
| 2008/0303894 | A1 * | 12/2008 | Ernst .................... | H04N 13/261 348/43 |
| 2009/0167923 | A1 * | 7/2009 | Safaee-Rad ............. | G06T 7/571 348/345 |
| 2010/0080481 | A1 | 4/2010 | Chen et al. | |
| 2011/0222734 | A1 | 9/2011 | Angot et al. | |
| 2011/0316982 | A1 * | 12/2011 | Steurer .................. | G06T 7/571 348/49 |
| 2012/0070070 | A1 * | 3/2012 | Litvak ................ | G06K 9/00201 382/154 |

(Continued)

OTHER PUBLICATIONS

European Patent Office, Examination of European Application 15 202 560.7 (Dec. 20, 2017) (Year: 2017).*

(Continued)

*Primary Examiner* — David N Werner
(74) *Attorney, Agent, or Firm* — Crowe & Dunlevy (57) ABSTRACT

A camera module with a fixed near field focus is configured to capture a single image. That single image is segmented by an image divider a number of regions. A focus metric determiner then determines a focus metric for each of the regions. A depth map generator maps the focus metric into a depth value for each of the regions and combines the depth values to generate a depth map.

6 Claims, 10 Drawing Sheets

(56) References Cited

U.S. PATENT DOCUMENTS

| | | | | |
|---|---|---|---|---|
| 2012/0148109 | A1* | 6/2012 | Kawamura | G01C 3/06 382/106 |
| 2012/0200673 | A1* | 8/2012 | Tagawa | H04N 5/23212 348/46 |
| 2012/0288157 | A1* | 11/2012 | Kishima | G06T 7/571 382/106 |
| 2013/0033579 | A1* | 2/2013 | Wajs | G06T 7/571 348/46 |
| 2013/0101177 | A1* | 4/2013 | Yamada | G06T 7/571 382/107 |
| 2013/0278817 | A1* | 10/2013 | Ikemoto | H04N 5/23212 348/348 |
| 2013/0307966 | A1* | 11/2013 | Komatsu | G06T 7/571 348/135 |
| 2014/0118556 | A1* | 5/2014 | Huang | H04N 5/2256 348/169 |
| 2014/0168062 | A1 | 6/2014 | Katz et al. | |
| 2014/0176750 | A1* | 6/2014 | Pajak | H04N 5/225 348/222.1 |
| 2015/0086127 | A1* | 3/2015 | Camilus | G06T 5/002 382/264 |

OTHER PUBLICATIONS

V. Murino & A. Trucco, "Underwater 3D Imaging by FFT Dynamic Focusing Beamforming", Proc. of the 1 Int'l Conf. on Image Processing 890-894 (Nov. 1994) (Year: 1994).*

S. Bae & F. Durand, "Defocus Magnification", 26 Computer Graphics Forum 571-579 (Sep. 2007) (Year: 2007).*

F.C.A. Groen, I.T. Young, & G. Ligthart, "A comparison of different focus functions for use in autofocus algorithms", 6 Ctyometry Part A 81-91 (Mar. 1985) (Year: 1985).*

M.W. Tao, S. Hadap, J. Malik, & R. Ramamoorthi, "Depth from Combining Defocus and Correspondence Using Light-Field Cameras", 2013 IEEE Int'l Conf. on Computer Vision 673-680 (Dec. 2013) (Year: 2013).*

S.A. Valencia & R.M. Rodriguez-Dagnino, "Synthesizing stereo 3D vies from focus cues in monoscopic 2D images", 5006 Proceedings of SPIE 377-388 (May 30, 2003) (Year: 2003).*

E.H. Adelson & J.Y.A. Wang, "Single Lens Stereo with a Plenoptic Camera", 2 IEEE Transactions on Pattern Analysis & Machine Intelligence 99-106 (Feb. 1992) (Year: 1992).*

Z. Lu, Y.W. Tai, F. Deng, M. Ben-Ezra, & M.S. Brown, "A 3D Imaging Framework Based on High-Resolution Photometric-Stereo and Low-Resolution Depth", 102 Int'l J. of Computer Vision 18-32 (Mar. 2013) (Year: 2013).*

M. Samaan, R. Héno, & M. Pierrot-Deseilligny, "Close Range Photogrammetric Tools for Small 3D Archaeological Objects", 24 Int'l CIPA Symposium 549-553 (Sep. 2013) (Year: 2013).*

E.H. Edelson & J.Y.A. Wang, "A Stereoscopic Camera Emplying a Single Main Lens", Proceedings of the 1991 IEEE computer Society Conf. on Computer Vision & Pattern Recognition 619-624 (Jun. 1991) (Year: 1991).*

G. Percoco & A.J. Sánchez Salmerón, "Photogrammetric measurement of 3D freeform millimetre-sized objects with micro features: an experimental validation of the close-range camera calibration model for narrow angles of view", 26 Measurement Sci. & Tech. No. 095203 (Jul. 2015) (Year: 2015).*

I. Lertrusdachakul, Y.D. Fougerolle, & O. Laligant, "A novel 3D reconstruction approach by dynamic (de)focused light", 7538 Proc. SPIE 1-10 (Jan. 28, 2010) (Year: 2010).*

EPO Search Report and Written Opinion for EP 15202560.7 dated May 23, 2016 (9 pages).

Klen Copic Pucihar and Paul Coulton: "Estimating Scale Using Depth From Focus for Mobile Augmented Reality," http://eprints.lancs.ac.uk/39956/1/Estimating_Scale_using_Depth_From_Focus_for_Mobile_Augmented_Reality_DRAFT.pdf, School of Computing and Communications InfoLab21, Lancaster University, Mar. 15, 2011 (6 pages).

First Office Action and Search Report from co-pending CN Appl. No. 201610267138.7 dated Mar. 5, 2018 (7 pages).

\* cited by examiner

|   |   |   |   |   |   |
|---|---|---|---|---|---|
| 0 | 0 | 0 | 0 | 0 | 0 |
| 0 | 1 | 1 | 1 | 1 | 1 |
| 1 | 1 | 1 | 2 | 1 | 1 |
| 1 | 1 | 1 | 2 | 1 | 1 |
| 1 | 4 | 5 | 1 | 1 | 1 |
| 0 | 2 | 3 | 3 | 3 | 1 |
| 0 | 2 | 2 | 3 | 3 | 1 |
| 0 | 0 | 1 | 1 | 1 | 0 |

DEPTH MAPS GENERATED FROM A SINGLE SENSOR

PRIORITY CLAIM

This application claims priority from European Application for Patent No. 15202560.7 filed Dec. 23, 2015, the disclosure of which is incorporated by reference.

FIELD OF THE INVENTION

Some embodiments relate to an apparatus and methods for generating a depth map from a single image captured from an image sensor.

BACKGROUND

Image sensors using photodiode pixels, for example implemented in CMOS architecture, are known. Such image sensors have many applications. In some applications, an array of pixels may be provided. Devices for determining the distance to objects are known.

Furthermore current photonics 3D map/depth devices are typically limited to a single application for which they are optimized. For example, in some devices multiple cameras or camera arrays provide images may be used to determine the range. Computational camera applications may compare features within these images and using the knowledge of intrinsic and extrinsic parameters associated with the cameras or camera arrays determine the distance from the device. Computational camera applications thus can create 3D images with associated 3D depth maps.

SUMMARY

According to a first aspect there is provided an apparatus for generating a depth map comprising: a single camera module with a fixed near field focus configured to capture a single image; an image divider configured to segment the image into a plurality of regions; a focus metric determiner configured to determine a focus metric for each of the plurality of regions; and a depth map generator configured to map the focus metric into a depth value for each of the plurality of regions and combine the plurality of depth values to generate a depth map for the single camera.

The single camera module may be configured to capture a further single image, the image divider may be configured to segment the further image into the plurality of regions, the focus metric determiner may be configured to determine a further focus metric for each of the plurality of regions; and the depth map generator may be configured to map the focus metric into a further depth value for each of the plurality of regions and combine the plurality of further depth values to generate a further depth map for the single camera.

The apparatus may further comprise an object determiner configured to determine from the depth map a location within the depth map associated with at least one object separate from a background.

The object determiner may be configured to determine from the further depth map a location within the further depth map associated with the at least one object.

The apparatus may further comprise an object tracker configured to track a change between the location within the depth map associated with at least one object separate from a background and the location within the further depth map associated with the at least one object.

The apparatus may further comprise a gesture determiner configured to recognize a gesture from at least one of: the location within the depth map associated with at least one object separate from a background; the location within the further depth map associated with the at least one object; and the change between the location within the depth map associated with at least one object separate from a background and the location within the further depth map associated with the at least one object.

The apparatus may further comprise a controller configured to control a function of the apparatus based on the recognized gesture.

According to a second aspect there is provided a method for generating a depth map comprising: capturing a single image with a single camera module with a fixed near field focus; segmenting the image into a plurality of regions; determining a focus metric for each of the plurality of regions; mapping the focus metric into a depth value for each of the plurality of regions; and combining the plurality of depth values to generate a depth map for the single camera.

The method may further comprise: capturing a further single image from the single camera module; segmenting the further image into the plurality of regions; determining a further focus metric for each of the plurality of regions; mapping the focus metric into a further depth value for each of the plurality of regions; and combining the plurality of further depth values to generate a further depth map for the single camera.

The method may further comprise determining from the depth map a location within the depth map associated with at least one object separate from a background.

The method may further comprise determining from the further depth map a location within the further depth map associated with the at least one object.

The method may further comprise tracking a change between the location within the depth map associated with at least one object separate from a background and the location within the further depth map associated with the at least one object.

The method may further comprise recognizing a gesture from at least one of: the location within the depth map associated with at least one object separate from a background; the location within the further depth map associated with the at least one object; and the change between the location within the depth map associated with at least one object separate from a background and the location within the further depth map associated with the at least one object.

The method may further comprise controlling a function of the apparatus based on the recognized gesture.

According to a third aspect there is provided an apparatus for generating a depth map comprising: means for capturing a single image with a single camera module with a fixed near field focus; means for segmenting the image into a plurality of regions; means for determining a focus metric for each of the plurality of regions; means for mapping the focus metric into a depth value for each of the plurality of regions; and means for combining the plurality of depth values to generate a depth map for the single camera.

The apparatus may further comprise: means for capturing a further single image from the single camera module; means for segmenting the further image into the plurality of regions; means for determining a further focus metric for each of the plurality of regions; means for mapping the focus metric into a further depth value for each of the plurality of regions; and means for combining the plurality of further depth values to generate a further depth map for the single camera.

The apparatus may further comprise means for determining from the depth map a location within the depth map associated with at least one object separate from a background.

The apparatus may further comprise means for determining from the further depth map a location within the further depth map associated with the at least one object.

The apparatus may further comprise means for tracking a change between the location within the depth map associated with at least one object separate from a background and the location within the further depth map associated with the at least one object.

The apparatus may further comprise means for recognizing a gesture from at least one of: the location within the depth map associated with at least one object separate from a background; the location within the further depth map associated with the at least one object; and the change between the location within the depth map associated with at least one object separate from a background and the location within the further depth map associated with the at least one object.

The apparatus may further comprise means for controlling a function of the apparatus based on the recognized gesture.

BRIEF DESCRIPTION OF THE DRAWINGS

Reference is now made by way of example only to the accompanying drawings in which.

DETAILED DESCRIPTION OF SOME EMBODIMENTS

The concept associated with embodiments as described herein is the employment of a single camera to determine a depth map from a single image.

A conventional multiple camera or camera array implementation in a mobile phone may, for example, determine an object's motion away from the mobile phone and thus enable gesture control of the mobile phone. First, the multiple cameras may capture images. The Image Signal Processor (ISP) or processor may then post-process the images to construct a 3D map. Although a multi-camera implementation typically does not increase the mobile phone's Z height (or the thickness), which is common problem for higher resolution mobile cameras in the "pixel race" the use of dual or multiple cameras in a device requires twice (or M times) the volume of a single camera. Furthermore, in some embodiments depth maps may be generated from a single camera augmented with a time of flight or similar optical sensor. Such configurations are problematic and require significant hardware and processing in order to determine the depth map.

In some situations, a single camera may determine a depth map from multiple images. For example, by taking two or more separate images with different focus points or a camera enabled to scan (in other words capture images from 2 separate points of view). In such embodiments there is a problem in that the exposures taken at different times may be images of two different objects (for example when an object is moving very quickly) or images of the same object having moved between the exposures.

The concept as further described hereafter is related to apparatus and methods for generating a depth map from a single image. In such apparatus a single camera with a fixed focus and with a short depth of field is used to capture an image which may be divided into regions (of interest). These image regions or parts or segments may be analyzed to determine a focus metric for each region. Then, using the relationship between the focus metric value and an object distance from the sensor a series of object distance, values for each region are generated to form a depth map. The generated depth map may then be analyzed to determine and classify objects and furthermore the track the objects, for example, tracking a finger or hand position. The tracking of the objects may then be used to perform gesture determination and furthermore to control functions or parameters. For example, in an automotive environment a camera may be set in the car which captures images and determines a hand or finger object from which gesture recognition of the tracking of the object may control the audio volume function. In the following examples the depth maps are employed in object tracking and gesture recognition applications. However, it is understood that depth maps can have many potential applications.

Figure 1:
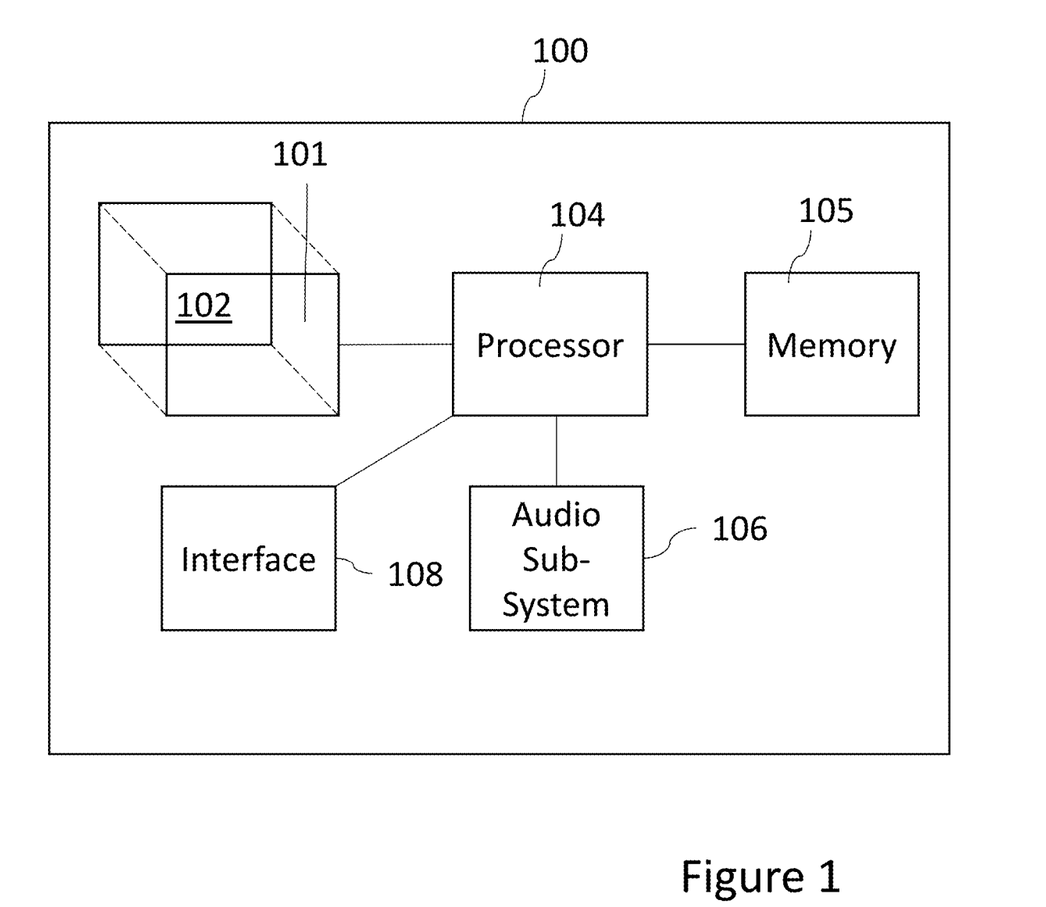
FIG. 1 shows an example device for generating depth maps from a single image comprising a single camera sensor arrangement.

With respect to FIG. 1 an example electronic device 100 is shown. The device 100 may comprise an array of pixels 102. The pixels of the array may be any suitable pixel type. Furthermore, over the array of pixels 102 is located a fixed focus short depth of field lens 101.

An output from the pixel array may be provided to a processor 104. The processor 104 may be configured to run or execute any suitable application or program, such as the single image depth map determination, object determination, object tracking, and gesture control. Furthermore, in some embodiments the device comprises memory 105 configured to store the application or program code and furthermore to store data such as the image data from the pixels 102, or the object classification and/or tracking data.

The output of the processor 104 may control, for example, an audio sub-system 106. However, any suitable output such as a display may be controlled. For example, the display may allow a representation of the depth map and/or the captured image to be displayed. Alternatively, or additionally, the depth map and/or object information and/or gesture control information may be output via an interface 108. The interface 108 may provide an output to another device and/or to a communications link. The communications link may be a radio link, the internet, a wireless local area network, a mobile communications network or any other suitable link.

Figure 3:
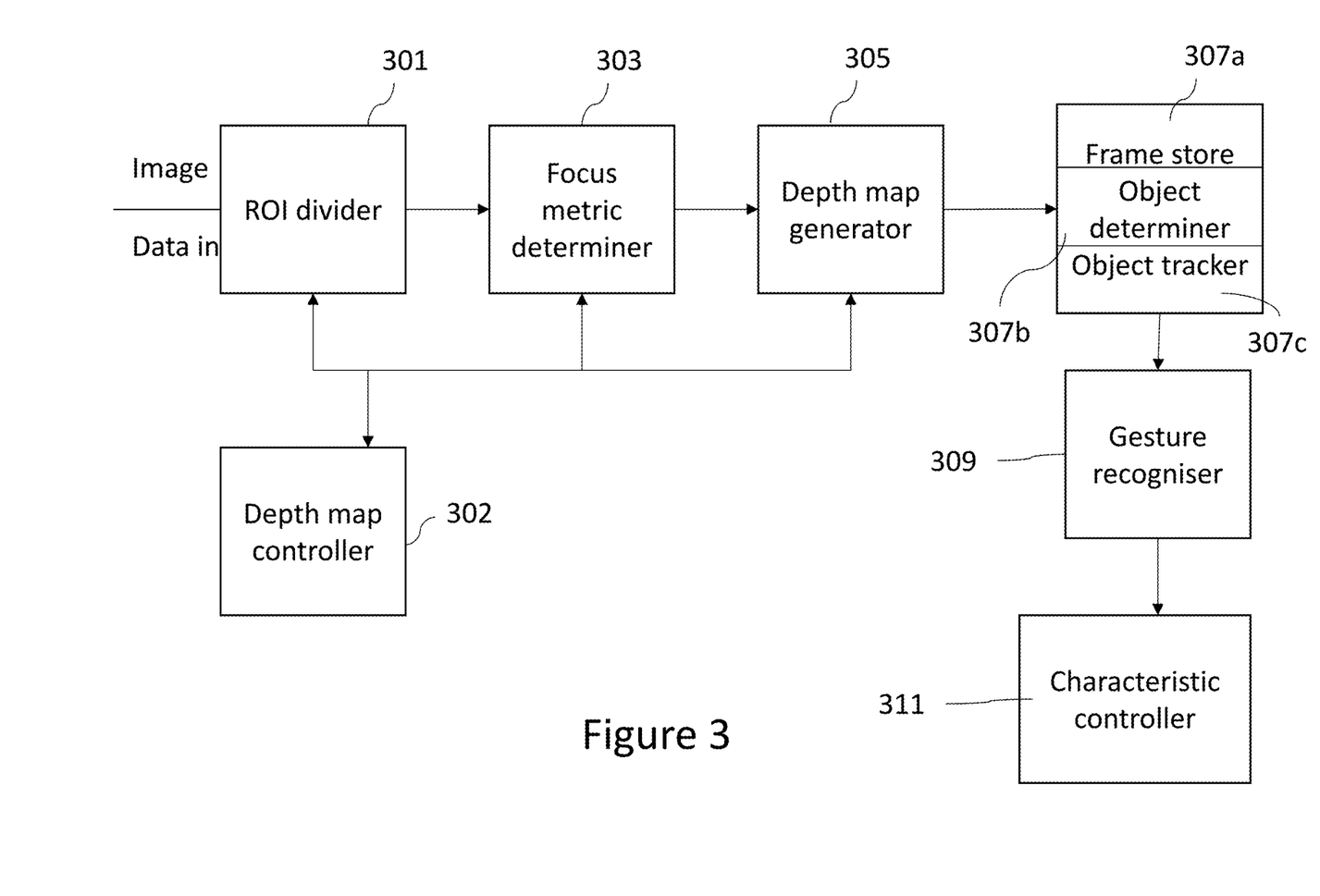
FIG. 3 shows an example depth map generator/gesture determiner apparatus.

With respect to FIG. 3 a schematic representation of the depth map generator/object analyzer/gesture determiner. In some embodiments, this functionality may be implemented within the processor and coded within programs stored in the memory. However, in some embodiments, the blocks shown in FIG. 3 are implemented within hardware or combination of hardware and software.

Figure 5A:
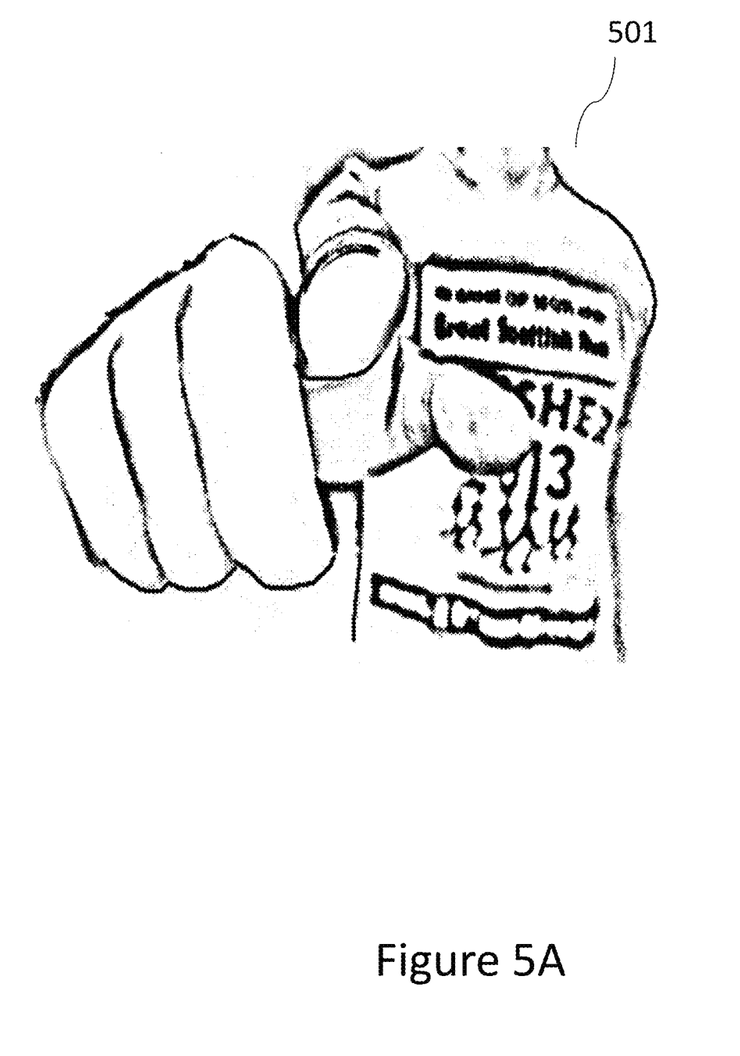
FIGS. 5A to 5D shows an example image, image with region of interest and focus measurement, and depth map generated from the image according to some embodiments.

FIG. 3, for example, shows a region of interest (RoI) divider 301. The RoI divider 301 may be configured to receive the image data from the fixed focus near macro camera. With respect to FIG. 5A an example captured image 501 shows an image of a hand close to the camera where the hand has a finger pointing at the camera.

The RoI divider 301 may then be configured to divide up the image into a number of different regions. The regions may be distributed over the image according to any desired arrangement. For example, in some embodiments the ROI divider is configured to generate a series of non-overlapping regularly distributed regions. However, the regions may be arranged in an irregular distribution, a non-overlapping/partially overlapping or overlapping distribution. The size of the ROIs may be tuned for a specific application.

Figure 2A:
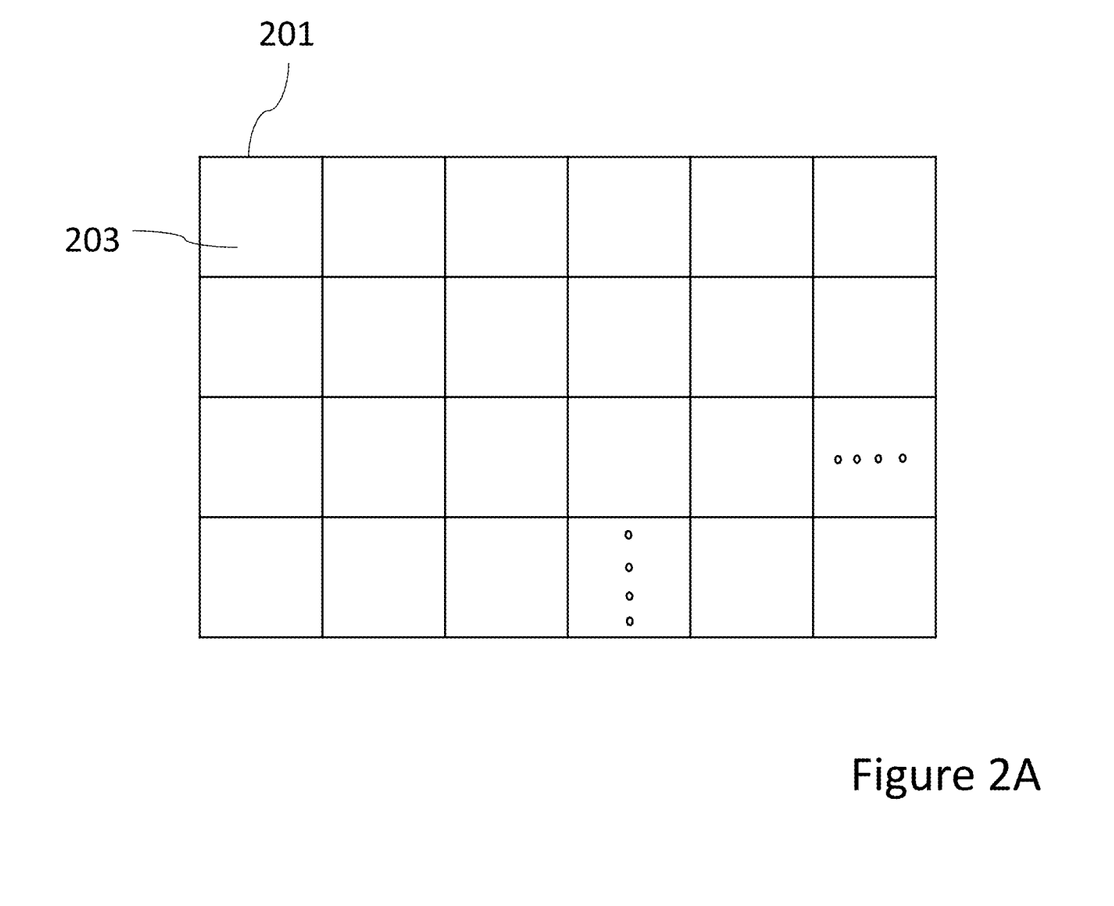
FIGS. 2A and 2B show example region of interest arrangements.
Figure 2B:
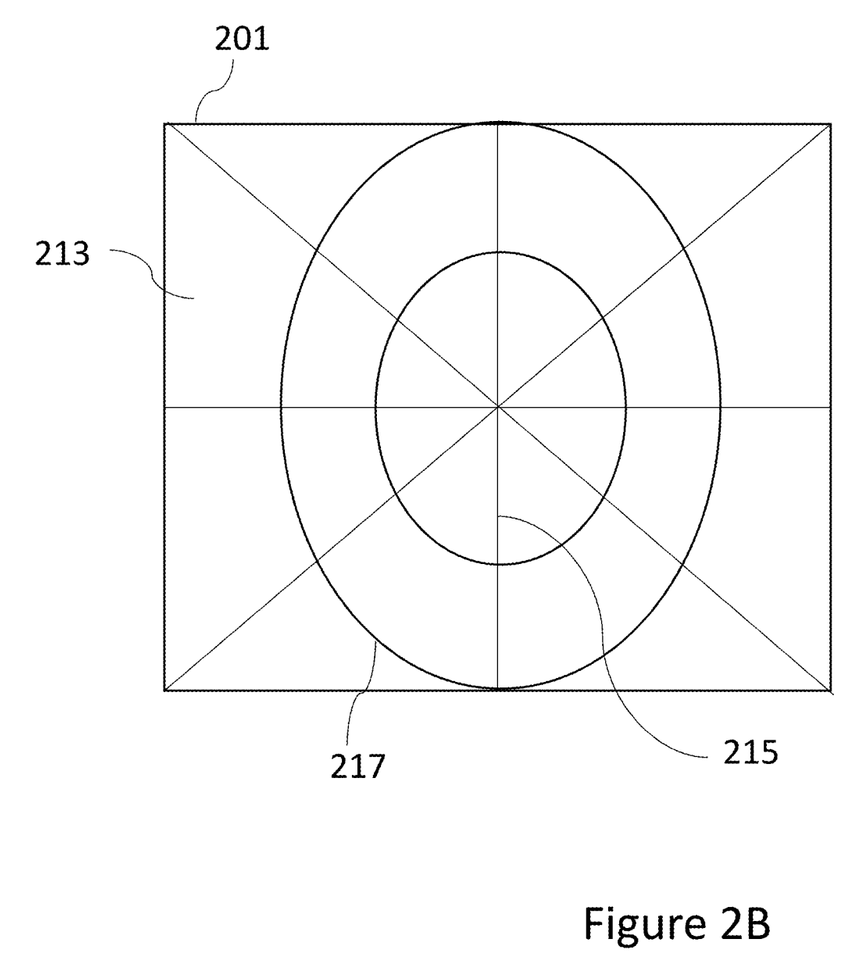
Figure 5B:
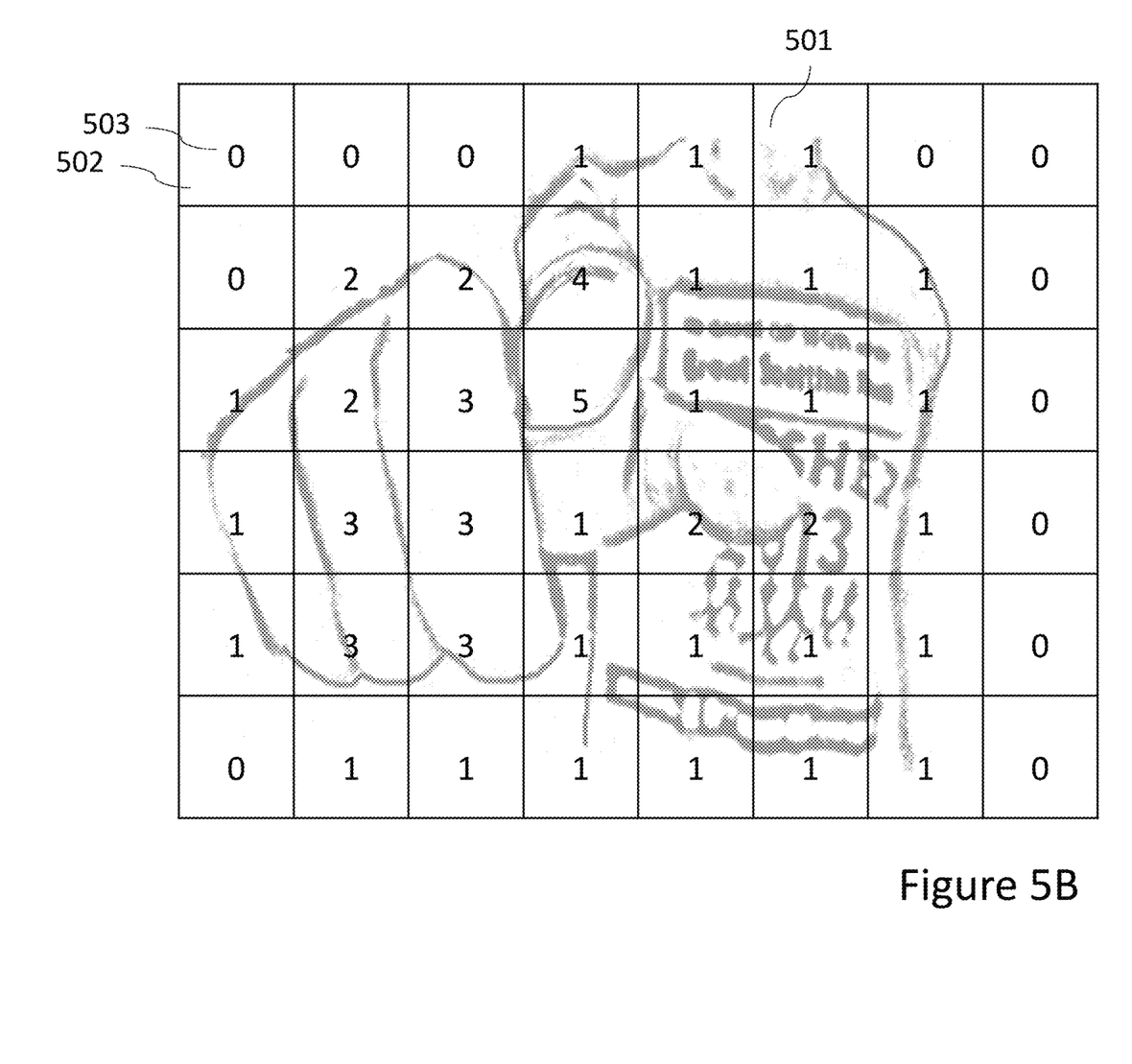

With respect to FIGS. 2A and 2B, two example region of interest arrangements of region of interest distributions are shown. For example, FIG. 2A shows a grid arrangement of regions wherein the image data 201 is divided up into rectangular or square regions 203 arranged in rows and columns. With respect to FIG. 2B, the image data 201 is divided up into an irregular arrangement where the regions 213 are divided by radial segments 215 intersecting at the center of the image and further divided by various concentric arcs 217 located at defined radius values from the center of the image. Furthermore, with respect to FIG. 5B, an example of the captured image 501 of FIG. 5A with regions of interest 502 is shown. FIG. 5B thus shows the overlaying of a grid of rectangular regions 502 arranged in rows and columns over the image. The RoI divider 301 may furthermore output image data for each of the determined regions to a focus metric determiner 303.

Figure 5C:
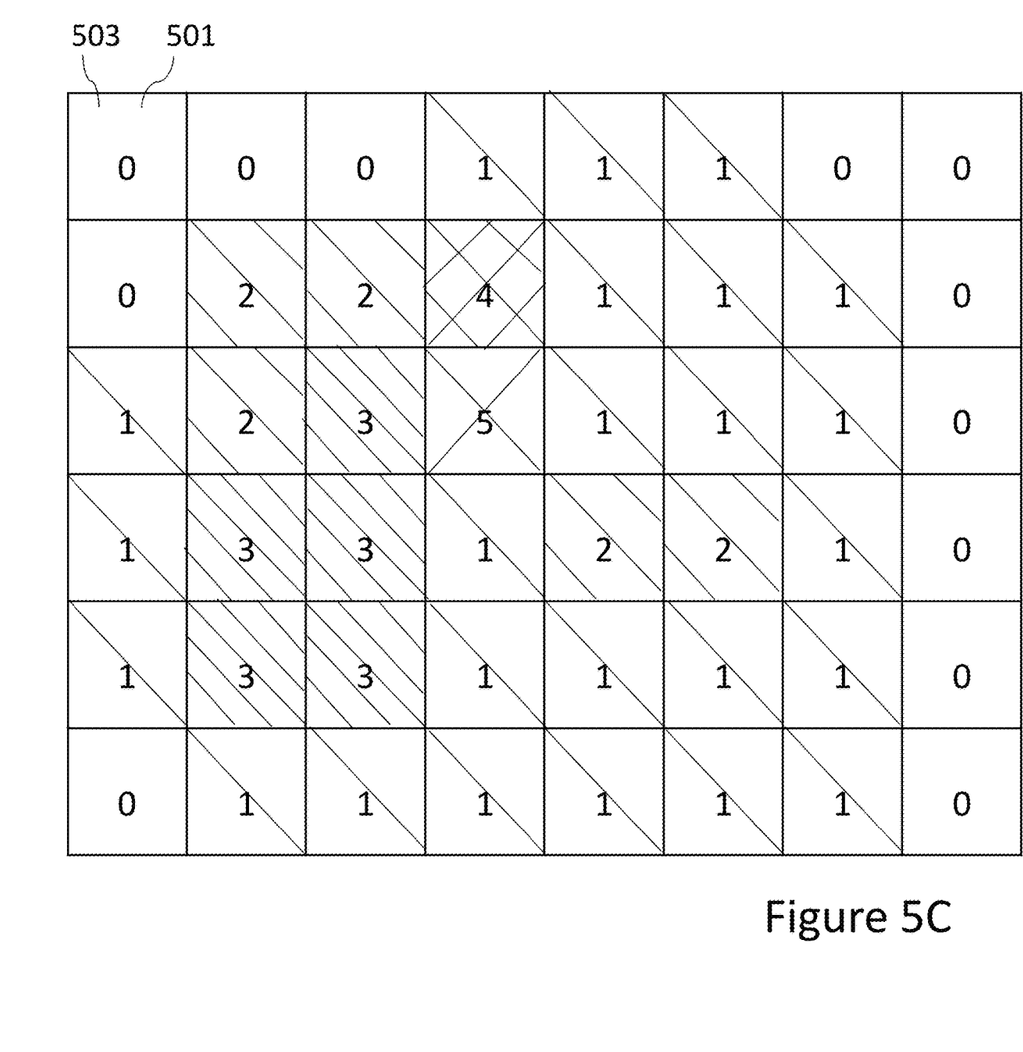

In some embodiments, a focus metric determiner 303 is configured to receive the image values associated with a defined region. The focus metric determiner 303 may be configured to determine a focus metric with respect to the image data for the region. This focus metric can be any suitable focus metric or measurement such as Modulation Transfer Function (MTF) or Spatial Frequency Response (SFR). The focus metric determiner 303 may then output the focus metric values for a region to a depth map generator 305. FIG. 5B thus further shows for each of the regions 501 a focus statistic or metric 503 indicating the sharpness of the image where the image is sharp when the finger is close to the camera and out of focus for the distant objects. In the example shown in FIGS. 5A to 5C the focus metric provides a measure from 0 (out of focus=distant) to 5 (in focus=near), however any other suitable metric range or scale can be implemented. In other words, a granularity of the focus statistic or metric may be controlled based on the application of the depth map.

In some embodiments, the depth map controller 302 may further control the focus metric determiner 303. For example, the focus metric determiner 303 may be configured to switch between focus metrics when implementing different applications.

Figure 5D:
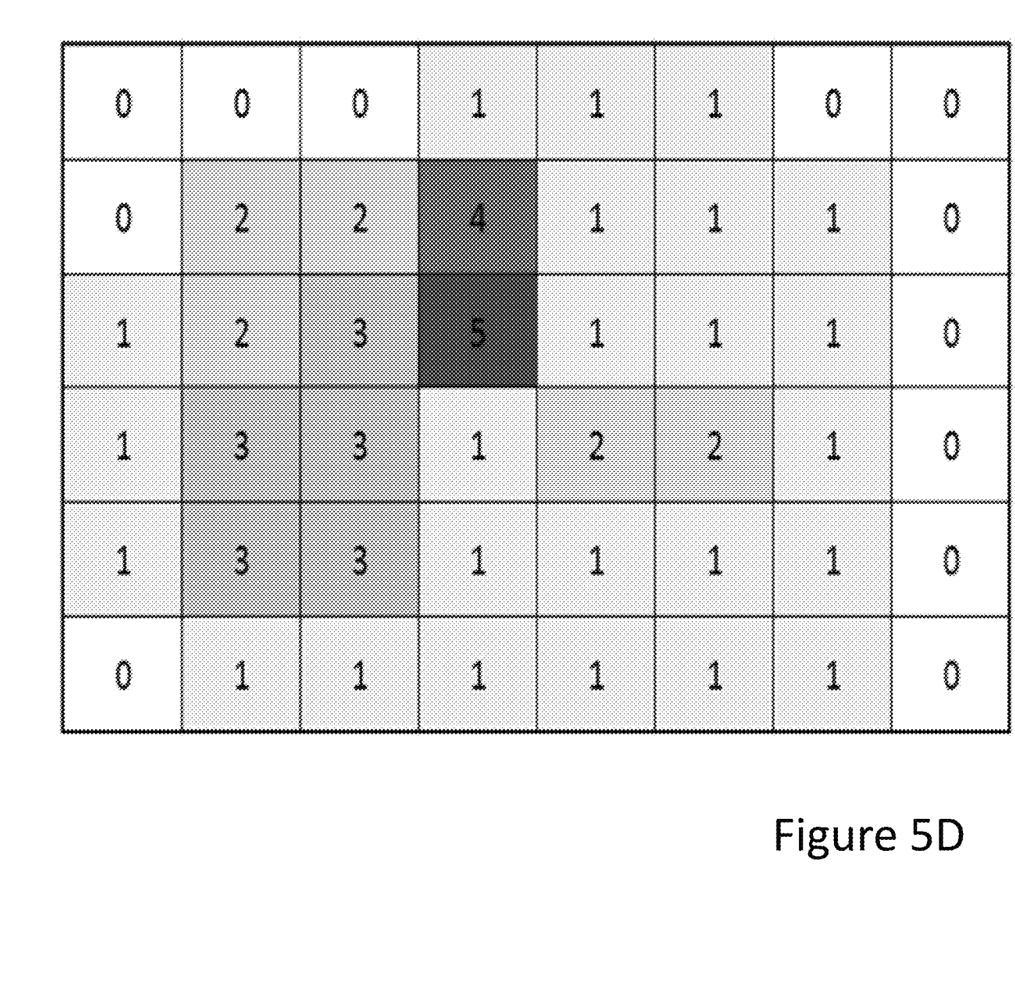

In some embodiments, a depth map generator 305 is configured to receive the focus metric values associated with each region and from this value determine a depth or distance value. This, for example, may comprise a mapping from the focused metric value to a depth map value. This mapping may be linear mapping or non-linear mapping. For example, FIG. 5D shows the mapping of the depth map from the focus metric values shown in FIG. 5B where the depth map region darkness intensity increases the nearer the object is to the camera. Thus with respect to the examples in FIG. 5A to 5D the regions associated with 'the finger' have the darkest regions indicated. In other words, knowing the distance at which the lens is focused, the distance versus focus stats curve may be measured and/or characterized. Therefore, the approximate distance of every object based on the individual region image focus metric values can be estimated.

In some embodiments, a depth map controller 302 may be configured to control the region of interest divider 301 to define the arrangement or configuration of the region of interests.

Figure 4:
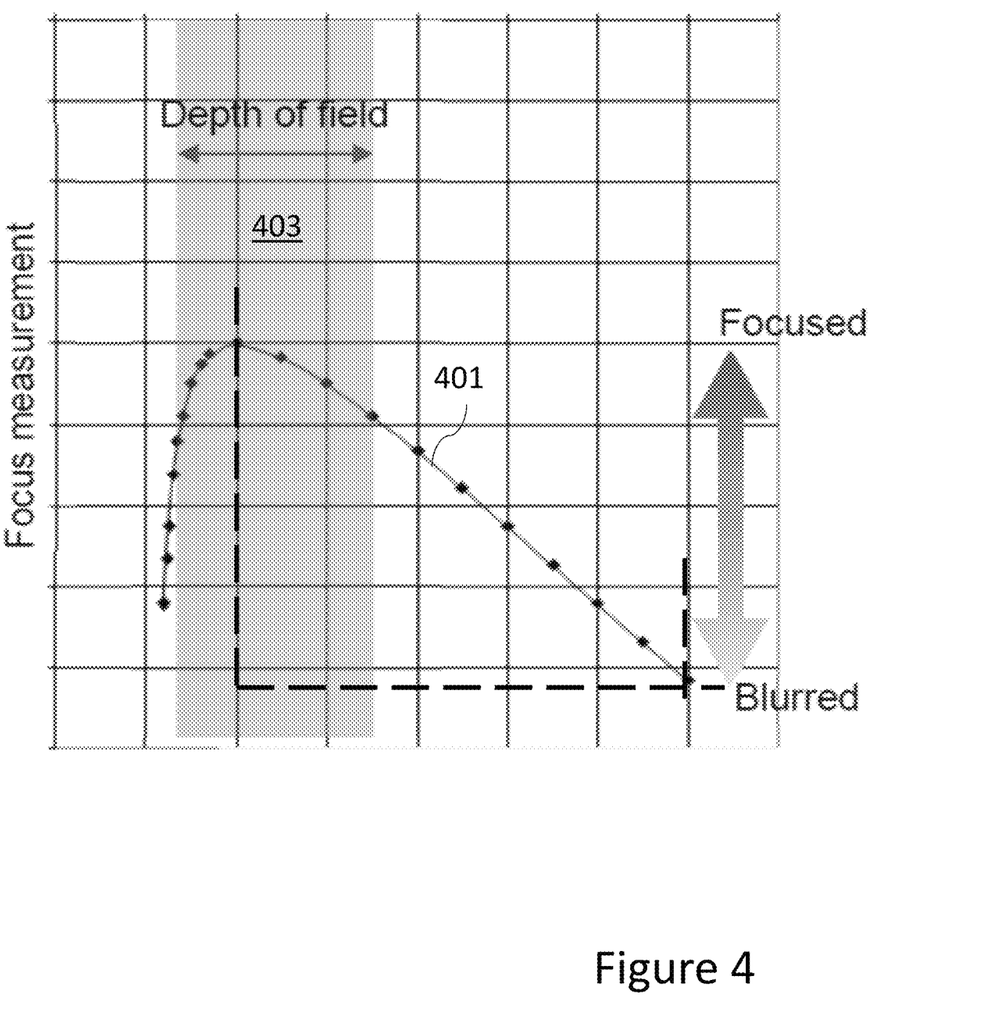
FIG. 4 shows an example focus measurement versus object distance graph.

With respect to FIG. 4, a graph of focus measurement against object distance is shown from which the depth map generator may use a contour 401 to map the focus value to a depth value. In FIG. 4, the camera with its fixed focus macro mode with short depth of field is configured such that any regions with parts of the image in focus, in other words a short distance from the camera would produce a high focus statistic or metric. Similarly, the same arrangement is configured such that any regions with parts of the image out of focus, for example at a distance from the camera, would produce a low focus statistic. In other words, as a low F number lens is used, the depth of field is kept short and high focus measurements produced for objects within the depth of field shown in FIG. 4 by area 403 and the metric decreases as the object distance increases. The depth map generator 305 may output a series of depth values (for example a depth map associated with the image regions) to a frame store 307a. In some embodiments the depth map controller 302 may be configured to determine a suitable mapping function to convert focus metric values to distance values.

FIG. 3 further shows a frame store 307a. The frame store 307a may be configured to receive the depth maps from the depth map generator 305. The frame store may then store these depth maps in a memory for later use such as object determination/classification/tracking and/or gesture determination.

FIG. 3 further shows an object determiner 307b which is configured to receive the depth maps from the depth map generator 305 or the frame store 307a. The object determiner 307b may identify or classify objects within the image from the depth map. The region with an object in the correct focal plane (a known range of distances from the camera) may then produce the highest focus metrics. Knowing the specific region allows the XY (and approximate Z) co-ordinates of the object to be calculated.

FIG. 3 furthermore shows an object tracker 307c. The object tracker 307c may receive information from the object determiner 307b over several frames and determine an object's trajectory in X, Y and Z directions based on the depth map generated from the image. In other words, the region with the best focus may be used for object tracking. In some embodiments, the object may be tracked while it stays in the same focal plane. However, in some embodiments, the object based on the region with the highest focus metric could still be tracked with the changes in distance relative to the camera also tracked.

In some embodiments where multiple regions have the same focus metrics, a decision may be made to either take the weighted centroid of the whole image (or regions with focus metrics>a determined threshold value) or locate and track multiple objects.

In some embodiments, the object tracker is configured to track, on a frame to frame basis as the object moves, the object XYZ co-ordinates. In such embodiments, a high frame rate camera may be employed to raise the maximum speed at which an object can travel while still being tracked.

In some embodiments, the determined objects from the object determiner 307b and the object tracking information from the object tracker 307c can be passed to a gesture recognizer 309.

In some embodiments the apparatus may comprise a gesture recognizer 309. The gesture recognizer 309 may be configured to receive the determined object and/or tracked objects and determine whether or not the motion of the tracked object in X, Y, and Z space match a defined gesture.

In some embodiments, the gesture recognizer 309 can be configured to learn new gestures, in other words the gesture recognizer 309 may be trained. The gesture recognizer 309 may be configured to output any identified gestures to a characteristic controller 311.

In some embodiments, the apparatus comprises a characteristic controller 311 configured to respond to a recognized gesture and control a function or characteristic of the apparatus based on the recognized gesture. For example, the characteristic controller may be configured to change the user interface display to display the next page of text or to raise or lower the volume of an audio track.

Figure 6:
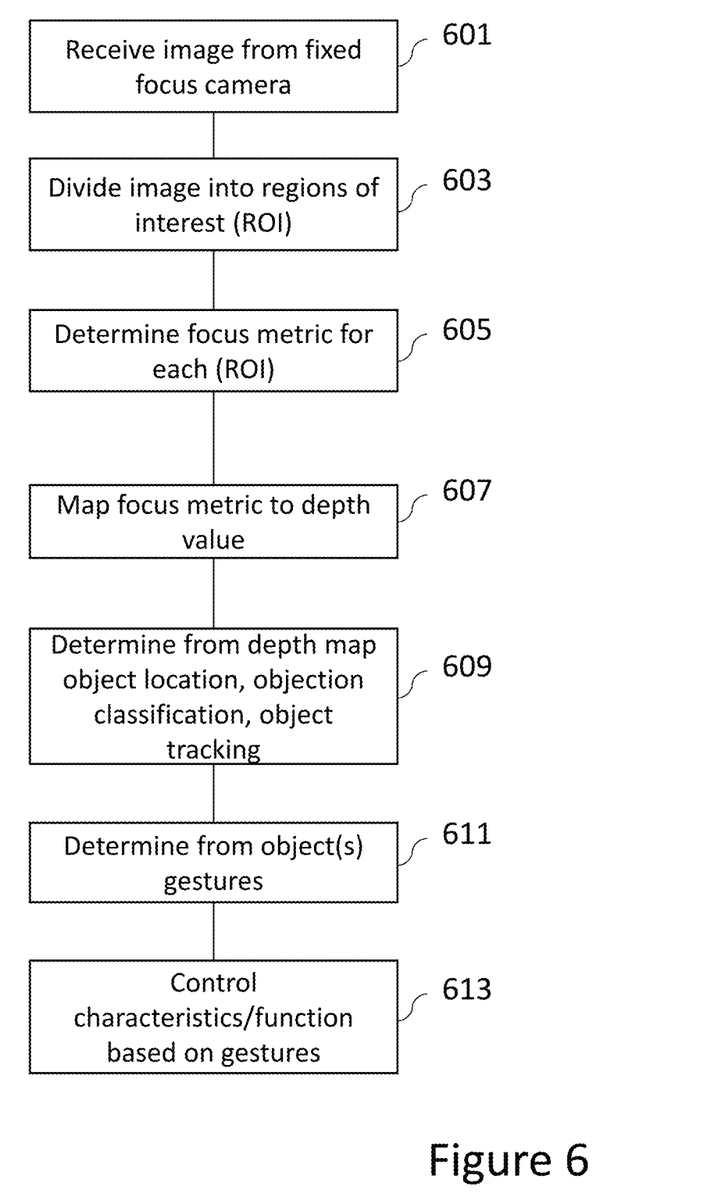
FIG. 6 shows a flow diagram of the operations of the depth map generator/gesture determiner apparatus as shown in FIG. 3.

With respect to FIG. 6, a flow diagram of an example operation of the apparatus such as shown in FIG. 3 is shown.

The apparatus is configured to receive the image from the fixed focus camera.

The operation of receiving the image from the fixed focus camera is shown in FIG. 6 by step 601.

The image can then be divided into regions.

The operation of dividing the image into regions (of interest) is shown in FIG. 6 by step 603.

The apparatus may further determine a focus metric for each region.

The operation of determining the focus metric for each region is shown in FIG. 6 by step 605.

Furthermore, the apparatus may be configured to map the determined region focus metrics to a depth value.

The operation of mapping the focus metric to a depth value is shown in FIG. 6 by step 607.

The apparatus may then be configured to determine from the depth map an object location and/or object classification and/or object tracking value. These values may be stored or used in further applications.

The operation of determining characteristics from the depth map for objects is shown in FIG. 6 by step 609.

Furthermore, in some embodiments the apparatus is configured to determine a gesture from the motion of the detected or determined object.

The operation of determining a gesture from the motion of an identified object gestures is shown in FIG. 6 by step 611.

Furthermore, in some embodiments the apparatus may be configured to control characteristics or/and functions of the apparatus based on the detected gestures.

The operation of controlling characteristic/functions based on the gestures is shown in FIG. 6 by step 613.

An example application may be within automotive gesture recognition. As this is effectively machine vision, various different algorithms (for example sharpening, edge enhancement, noise reduction, Canny filter, etc . . . ) may be applied to the image before collecting focus measurements or statistics. In some embodiments the apparatus image array is an IR region of the light spectrum sensitive array. Furthermore in some embodiments the apparatus further comprises an IR illuminator (IR LED) providing a light source.

Some embodiments may be provided in an electronic device. It should be appreciated that the device may be any suitable device. By way of example only and without limitation, that device may be a mobile telephone, smart phone, tablet, computer, camera or the like.

Various embodiments with different variations have been described here above. It should be noted that those skilled in the art may combine various elements of these various embodiments and variations. Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

The invention claimed is:

1. An apparatus, comprising:
a single camera module with a fixed focus macro mode configured to capture a first single image;
an image divider configured to segment the first single image into a plurality of regions;
a focus metric determiner configured to determine a focus metric for each region of the plurality of regions;
a depth map generator configured to map the focus metric into a depth value for each region of the plurality of regions and combine the depth values to generate a depth map; and
an object determiner configured to:
determine a certain region of the plurality of regions which has a highest focus metric and a smallest depth value;
determine a closest located object within the first single image based on the depth map and the determined certain region;
track the closest located object while it stays in a same focal plane as the certain region; and
cease to track the closest located object if it exits the same focal plane as the certain region.

2. The apparatus as claimed in claim 1, further comprising a gesture determiner configured to recognize a gesture from the tracking of the closest located object while it stays in the same focal plane as the certain region.

3. A method, comprising:
capturing a first single image with a single camera module with a fixed focus macro mode with short depth of field;
segmenting the first single image into a plurality of regions;
determining a focus metric for each region of the plurality of regions;
mapping the focus metric into a depth value for each region of the plurality of regions;
combining the depth values to generate a depth map;
determining a certain region of the plurality of regions which has a highest focus metric and a smallest depth value;
determining a closest located object within the first single image based on the depth map and the determined certain region;
tracking the closest located object while it stays in a same focal plane as the certain region; and
ceasing to track the closest located object if it exits the same focal plane as the certain region.

4. The method as claimed in claim 3, further comprising recognizing a gesture from the tracking of the closest located object while it stays in the same focal plane as the certain region.

5. A method, comprising:
capturing a first single image;
segmenting the first single image into regions;
determining a focus metric for each of the regions;
generating a depth map by mapping the focus metric into a depth value for each region and combining the depth values;
identifying a region having a highest focus metric and a smallest depth value;
locating a closest object within the first single image based on the depth map and the identified region; and
tracking the closest located object while it stays in a same focal plane as the identified region, and otherwise ceasing tracking of the closest located object.

6. The method as claimed in claim 5, further comprising recognizing a gesture from the tracking of the closest located object.

* * * * *